Sept. 3, 1957      S. HENIG      2,804,805

SHORT RAIL ROCKET LAUNCHER

Filed April 10, 1953

INVENTOR
SEYMOUR HENIG

BY
ATTORNEYS

United States Patent Office 2,804,805
Patented Sept. 3, 1957

2,804,805

SHORT RAIL ROCKET LAUNCHER

Seymour Henig, New Alexandria, Va., assignor to the United States of America as represented by the Secretary of the Navy Application April 10, 1953, Serial No. 348,144

4 Claims. (Cl. 89—1.7)

(Granted under Title 35, U. S. Code (1952), sec. 266)

The invention described herein may be manufactured and used by or for the Government of the United States of America for governmental purposes without the payment of any royalties thereon or therefor.

This invention relates to rocket launchers and more particularly to a launcher wherein the maximum accuracy of rocket trajectory is achieved by eliminating conventional rocket tip-off.

In conventional rocket launchers, as a rocket is propelled from a launcher the rocket body is confined and guided in its course for a substantial distance on a rocket launcher guide rail. However, when the leading edge or section of the rocket body departs or clears from the forward end of the supporting guide rail a yawing effect, known as "tip-off," is encountered which thereby deflects the missile from its prescribed course. The devices presently used for launching rockets employ a lengthy, cumbersome tube or guide rail to support the main body portion of the rocket and by guiding the propelled rocket for a substantial distance on the supporting rail there is a tendency to reduce the tip-off by initiating trajectory stability during propulsion. The large clearance areas required for training and elevating the long launcher rails does not permit a large concentration of fire power in limited areas, as aboard naval vessels.

Modified articulated rail structures made to support spaced rocket mounted lugs have reduced the tip-off effect somewhat, by having the supporting lugs leave the rail simultaneously. Increased accuracy has been obtained by this apparatus but the loading time for orienting the rocket into position on the lug engaging rails has been increased appreciably. Machining difficulties, increased cost of manufacturing and storage space requirements are the other attendant disadvantages to the use of such rail-lug engaging rockets.

It is therefore an object of this invention to provide a launcher which will eliminate rocket-tip-off by removing the contributing cause.

Another object of this invention is to provide a rocket launcher with an automatic mechanism which is actuated by the propelled rocket and motivated by the rocket exhaust gases to displace the launching rail from rocket contact thereby increasing missile accuracy by eliminating conventional tip-off.

A further object of this invention is to provide a launcher with a relatively short travel guide rail thereby permitting concentrated fire power in rather limited areas.

Another object of this invention is to utilize the energy from the exhaust gases of the rocket to assist rocket launching by timely accelerating the rail displacement normal to the rocket path without auxiliary external power.

Still another object of this invention is to provide a simply constructed rapidly loadable rocket launcher which necessitates a minimum of maintenance.

Other objects and many of the attendant advantages of this invention will be readily appreciated as the same becomes better understood by reference to the following detailed description when considered in connection with the accompanying drawings wherein.

Figure 1:
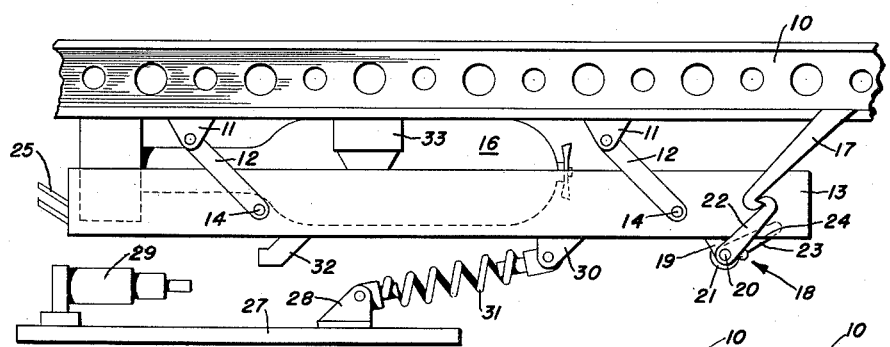
Fig. 1 is a side elevational view of a short rail rocket launcher illustrating one embodiment of the present invention with a rocket lodged in the firing position.

In the embodiment illustrated a rocket launcher frame of spaced parallel channel members 10 is supported in any suitable fashion on board a naval vessel or other installation. Suitable training and elevating mechanisms (not shown) may be employed to control the positioning of a single or a battery of the rocket launchers. Spaced longitudinally along the lower web of the channels 10 are bifurcated lugs 11 secured to the channels 10 as by welding. Pivot links 12 of equal length engage the bifurcated lugs 11 to move in prescribed arcs from the frame members 10. Beneath the frame and pivotally supported parallel therefrom by the free ends of pivot links 12 is a short length rocket launcher rail 13, substantially U-shaped in cross-sectional area. Pivot link stub pins 14 are fastened to the rail 13 to engage the free ends of the pivot links 12 and pivotally support the launcher rail in a parallel relation with the frame members 10. Launcher rail rocket guides or bearing surfaces 15 will align and longitudinally support the rocket 16 by linear contact with the rocket periphery thereby reducing rocket frictional resistance during initial propulsion.

Projecting downwardly from the rocket discharge section of the frame members 10 are hook-like rail securing latches 17 laterally spaced to permit sufficient clearance for the launcher rail 13 to pass therebetween when the rail is in the loading position as shown in Fig. 1. A rocket engaging spring cam and pawl assembly 18 is cooperatively engaged by the rail securing latches 17 to maintain releasably the launching rail in the loading and firing position.

The rocket engaging releasable cam and pawl assembly 18 is secured for pivotal movement from the launcher rail by lugs 19 which are mounted beneath the launcher rail to receive the cam and pawl shaft 20. The cam and pawl assembly 18 mounted on the shaft 20 comprises pawls 22 and a rail releasing cam 23 keyed to the shaft 20. The spring 21 encircles the shaft 20 to urge the cam and pawl assembly 18 into engagement with the hook-like latches 17 projecting from the members 10.

Figure 2:
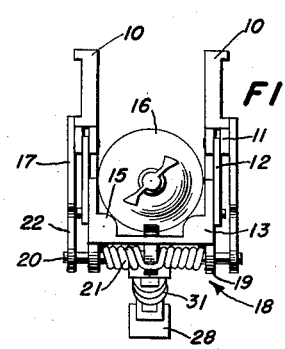
Fig. 2 is a front view of the embodiment illustrated in Fig. 1 showing the rocket supported within the launching rack assembly.

It is to be noted that upon engagement of the pawls 22 and the latches 17 the rail 13 is disposed parallel to the frame members 10 and forms a compact launching assembly ready for firing the rocket 16 which is seated within the enclosure formed by the rail 13 and the frame members 10 and rests on guides 15 as shown in Figs. 1 and 2.

Rail releasing cam 23 spaced intermediate the shaft 20 projects through an elongated aperture 24 within the rail 13 and has been keyed to the shaft 20. Upon clockwise rotation of the shaft 20 induced by releasing cam 23 being contacted by the nose of the propelled rocket 16, the latches 17 and pawls 22 which support the rail 13 in spaced relation to the frame members 10 will be disengaged thereby permitting the rail 13 to be displaced parallel to the supporting frame members 10.

Figure 5:
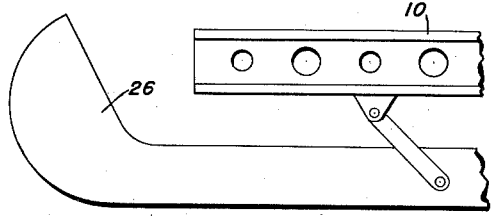
Fig. 5 is a fragmentary side elevational view of the rear section of the launcher rail showing a modified form of gas deflector baffle.

A group of gas deflector vanes 25, illustrated in Fig. 1 as one embodiment, is mounted on the gas discharge side of the launcher and angularly disposed to provide a suitable thrust component which will be normal to the axis of the rail for the purpose to be explained hereinafter. A modified form of gas deflector baffle also suitable for the intended purpose is shown in Fig. 5. The actual configuration of the gas deflectors may vary depending upon the resultant impact of the exhaust gases so long as the thrust component normal to the axis of the rail is sufficient for the particular installation.

Impact from the exhaust gases emitted from the tail end of the rocket 16 produces a resultant thrust against the gas deflector baffles 25 which may be resolved into horizontal and vertical components with respect to the axis of the rail 13. The component normal to the rail 13 or vertical component in the embodiment illustrated will be of sufficient magnitude to produce a downward acceleration of the rail 13 greater than the gravitational effect of a freely falling rocket. It may be readily appreciated that upon receiving the blast of exhaust gases against the deflector baffles 25 a downward thrust is applied and as the rocket advances through the launcher the forward momentum of the rocket will be sustained by the initial impulse to counteract partially the gravitational effect of the rocket. As the nose of the rocket trips the releasing cam 23 the latches 17 and pawls 22 are disengaged thereby releasing the rail 13 for accelerated displacement normal to the path of the rocket as shown in Figs. 3 and 4 thereby permitting the rocket to pass unsupported and unimpeded through the launcher without the conventional rocket tip-off.

A snubber and rail return spring base plate 27 suitably spaced from the rail 13 supports a pivotal clevis joint and flange 28 and a rail limiting snubber 29. Secured to the undersurface of the rail 13 in advance of the clevis joint and flange 28 on the plate 27 is a similar pivotal clevis joint and flange 30 provided to accommodate a spring 31.

A limit stop 32 is selectively positioned on the undersurface of the rail 13 to limit the horizontal as well as the vertical displacement of the rail upon rocket discharge as the limit stop 32 engages the stop or snubber 29 on plate 27 in the downward thrust.

Figure 3:
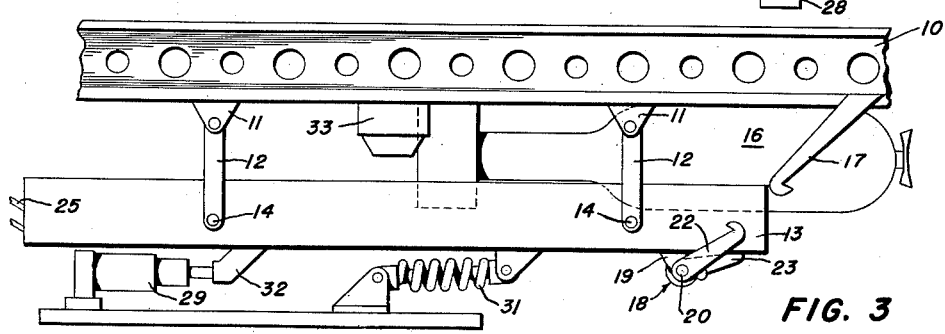
Fig. 3 is a view similar to Fig. 1 but illustrating the positions of the parts immediately after a rocket has been fired.
Figure 4:
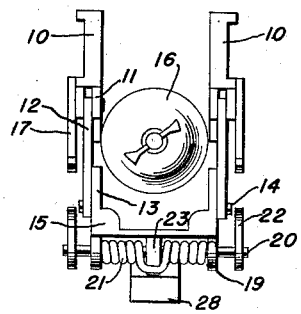
Fig. 4 is a view similar to Fig. 2 but illustrating the positions of the parts immediately after a rocket has been fired.

Spring 31 yieldably connects the rail 13 to plate 27 and serves both to re-establish the rail to the firing position as shown in Fig. 1 and to act as a shock absorber by compressing during rocket discharge as shown in Fig. 3. As the rocket leaves the launcher and the exhaust gases cease to exert a downward thrust on the rail 13 through deflector baffle 25 the recoil energy stored in the compressed spring 31 will force the rail 13 back to its original position, as shown in Fig. 1, enabling the latches 17 and pawls 22 to become engaged. Upward movement of the rail induced by the spring action is limited by frame member snubbers 33 fastened to the underside of the members 10.

The operation of the short length rocket launcher will be described by designating Fig. 1 as the ready or loading position and Fig. 3 as the launched or discharge position. A rocket is inserted from the forward end of the launcher shroud end first and is supported by rail guides 15 in U-shaped rail 13. The rail 13 is spaced parallel to frame members 10 by connecting pivotal links 12 which will maintain this parallel relation. The spring cam and pawl assembly 18 cooperatively interlocks the latches 17 with the pawls 22 to maintain the rail in the ready position assisted by the spring 31. Upon firing the rocket the exhaust gases discharged from the tail end of the rocket impinge against the deflector baffles 25 and the thrust component normal to the axis of the rail exerts a force to displace the rail normal to the rocket path. As the rocket 16 advances within the launcher the leading edge strikes the releasing cam 23 which is keyed to the shaft 20 thereby rotating pawls 22 out of engagement with the latches 17 permitting the rail to be accelerated normal to the rocket path as shown in Fig. 2. As the rail is displaced from the firing position the spring 31 is compressed and the limiting stop 32 engages snubber 29. Since the rocket clears the launcher rail without contact at the leading edge there is no yawing or tip-off effect. The spring on the cam and pawl assembly 18 rotates the shaft 20 counterclockwise conditioning the pawls 22 to engage the latches 17 as the spring 31 restores the rail to the firing position. Upward movement of the rail 13 is limited by the snubbers 33 so that the latches 17 may engage and lock with the pawls 22. After reloading the rocket launcher is again ready to fire another rocket.

Obviously many modifications and variations of the present invention are possible in the light of the above teachings. It is therefore to be understood that within the scope of the appended claims the invention may be practiced otherwise than as specifically described.

What is claimed is:

1. A short length rail launcher for discharging a rocket comprising; a supporting frame, a rocket supporting rail displaceable parallel to and pivotal from the underside of said frame, pivot links maintaining the frame and rail in parallel relation, a releasable latch means attached to said frame and to said rail for releasable engagement of the frame and the rail, said latch means having trip means located on the rail for disengagement by the forward end of the propelled rocket, deflector baffles positioned on the rail to deflect the rocket exhaust gases so that a downward thrust is applied to the rail displacing the rail from the fired rocket, snubbers positioned on the underside of said frame for limiting rail displacement positions, and a recuperative spring connected to the rail in order to re-establish the rail to the loading position upon rocket discharge.

2. A short length rail launcher for discharging a rocket comprising; a frame, a rocket guide rail displaceable from the underside of said frame and the propelled rocket, a releasable locking mechanism connected to the rail and to the frame for maintaining the rail in the firing position, said locking means including a release mechanism attached to the rail so as to be actuated by the forward end of the propelled rocket, deflecting means attached at the after end of the rail in alignment with rocket exhaust gases to create a thrust normal to the rocket displacing the rail upon release of the locking mechanism, and spring means attached to the forward end of the guide rail to restore the guide rail to the initial position after rocket discharge.

3. A short length rail launcher for discharging a rocket comprising; a frame, a rocket guide rail pivotally displaceable from the underside of said frame, a rocket actuated rail release mechanism connected to the rail and to the frame, deflecting means positioned at the after end of the rail in alignment with rocket exhaust gases to create a thrust normal to the guide rail upon actuation of the release mechanism to displace the guide rail from the rocket, and means connected to the rail so as to re-establish the guide rail to the initial firing position.

4. A short length rail launcher for discharging a rocket comprising; a supporting frame, a rocket supporting rail displaceable parallel to and pivotal from the underside of said frame, pivot links maintaining the frame and rail in parallel relation, pawls located on the forward end of said rocket supporting rail, latches on the forward end of said supporting frame to cooperatively interlock with said pawls to hold the rocket rail in ready position for firing the rocket, resilient means to urge said pawls into interlocking engagement with said latches, a releasing cam connected to said pawls and protruding upwardly through said rocket rail in the path of said rocket to be biased by said rocket to releasably rotate said pawls from engagement with said latches permitting the rocket rail to be accelerated normal to the rocket path, deflector baffles positioned on the after section of said rocket rail to deflect the rocket exhaust gases so that a downward thrust is applied to the rail displacing the rail from the fired rocket, a plate located below said rocket rail and in parallel relationship thereto, a recuperative spring connected at one end to said plate and at the other end to said rocket rail to re-establish the rail to the loading position upon rocket discharge, and snubbers located on said plate and on said supporting frame for limiting rail displacement positions.

References Cited in the file of this patent

UNITED STATES PATENTS

| | | |
|---|---|---|
| 1,045,075 | Pompili | Nov. 19, 1912 |
| 2,409,210 | Jolly | Oct. 15, 1946 |
| 2,481,542 | Schuyler | Sept. 13, 1949 |
| 2,544,830 | Grill et al. | Mar. 13, 1951 |
| 2,557,151 | Skinner et al. | June 19, 1951 |
| 2,585,030 | Nosher | Feb. 12, 1952 |
| 2,604,014 | Walker et al. | July 22, 1952 |

FOREIGN PATENTS

| | | |
|---|---|---|
| 573,735 | Great Britain | Dec. 4, 1945 |
| 457,201 | Italy | May 12, 1950 |
| 1,007,106 | France | Feb. 2, 1952 |
| 669,718 | Great Britain | Apr. 9, 1952 |